Nov. 20, 1956 C. W. HARRISON ET AL 2,771,517

POWER AMPLIFIER FOR TELEVISION

Filed Dec. 28, 1953

INVENTORS: C. W. HARRISON
G. NIELSEN JR.

BY Hugh S. Wertz
ATTORNEY

United States Patent Office 2,771,517

Patented Nov. 20, 1956

2,771,517

POWER AMPLIFIER FOR TELEVISION

Charles W. Harrison, Gillette, and George Nielsen, Jr., Bernardsville, N. J., assignors to Bell Telephone Laboratories, Incorporated, New York, N. Y., a corporation of New York Application December 28, 1953, Serial No. 400,561

8 Claims. (Cl. 179—171)

Figure 1:
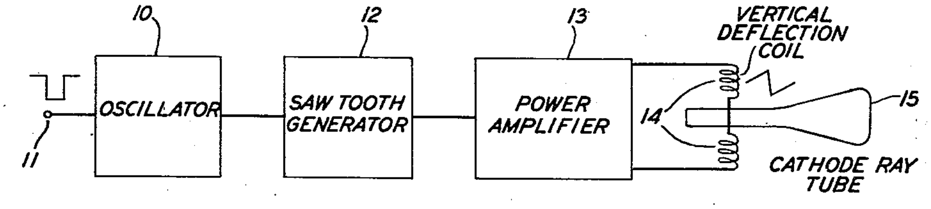

This invention relates to cathode ray tube deflection circuits and particularly to power amplifiers for use therein.

In the cathode ray tube art the difficulty of achieving linear sweep traces and of centering the sweep traces on the face of the cathode ray tube has been a continuing one. One means used in the art to solve the difficulty is to provide a sweep trace by generating an accurate linear sawtooth waveform of low power content, apply the waveform to the cathode ray tube deflection circuit through a power amplifier and center the produced trace by applying a separate variable direct current voltage directly to the deflection circuit. However, the power amplifiers known in the art inherently introduce some distortion into the sawtooth waveform. While the introduced distortion may be generally acceptable for normal cathode ray tube uses, in some applications, such as, for example flying spot scanners, the distortions are not tolerable.

The power amplifier distortions may be compensated by introducing negative feedback into the amplifier circuit. However, with the application of negative feedback centering of the sweep trace by the means described above becomes impossible because any direct current component independently applied to the deflection circuit is immediately compensated for in the feedback circuit of the amplifier and effectively removed from the deflection circuit. Hence, there is a problem in the electronics art as to how to accurately reproduce varying potential waveforms and also insert into the output of the reproducer a controllable constant potential waveform.

It is a general object of this invention to provide circuit means to overcome the above-mentioned problem.

A more specific object of the invention is to provide an improved cathode ray tube power amplifier for accurately reproducing sawtooth waveforms which includes a cathode ray beam centering control.

In one exemplary embodiment of the invention, an amplifier is adapted to receive input voltage waveforms and produce similarly shaped current waveforms in an output load. To achieve linear reproduction of the input waveform, feedback means are provided between the direct current coupled input stage and output stage. The output stage includes a parallel feed circuit one arm of which includes the output load. By appropriate choice of potentials and impedances in the parallel feed arms the direct current flow in the load can be substantially eliminated. A variable bias arrangement connected to the input stage provides in conjunction with the amplifier feedback and the direct current coupling between stages, a means for inserting into the output load a controllable flow of direct current.

One important advantage of the arrangement is that when the amplifier is used in a cathode ray tube deflection circuit the sawtooth input waveform is linearly reproduced in the deflection coil which comprises the output load.

Another important advantage is that the parallel feed circuit in the output stage provides automatic beam centering for the cathode ray tube.

A further advantage is that the variable bias at the input stage provides additional means for controlling the centering of the cathode ray beam without affecting the linearity of the reproduced deflection signal.

Figure 2:
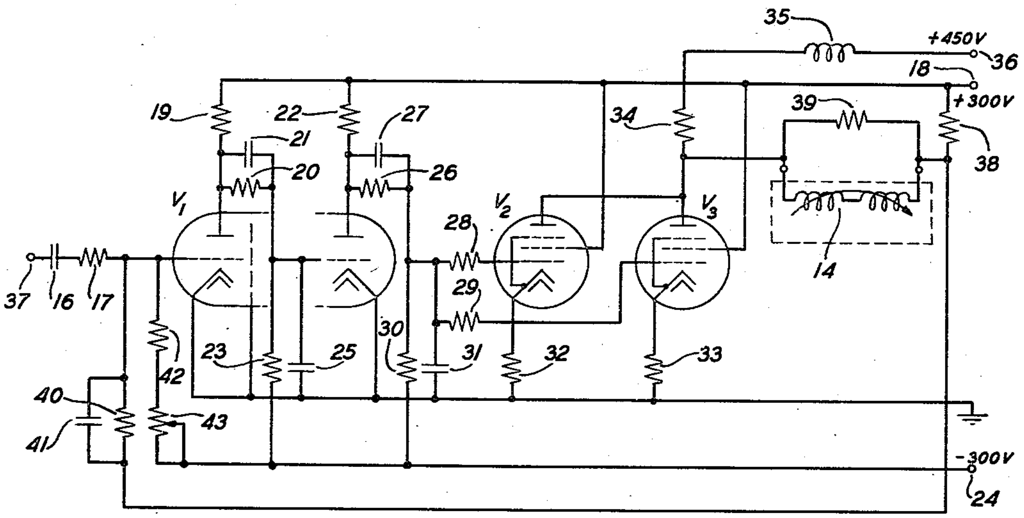

The invention, its objects and advantages will be better understood by referring to the following description and drawings forming a part thereof wherein:

Fig. 1 is a block diagram of a cathode ray tube deflection circuit including a power amplifier in accordance with the invention, and Fig. 2 is a circuit diagram in schematic form of a power amplifier in accordance with the invention.

Referring particularly to Fig. 1, there is shown, by way of example for purposes of illustration, a cathode ray tube vertical deflection circuit including an oscillator 10 which may be of the multivibrator type, the frequency of which is controlled by vertical synchronizing signals applied at the input terminal 11. These oscillations are applied to a sawtooth generator 12 wherein deflection waveforms are produced having linear sweep portions. As linearity is most easily achieved in waves of low power content which in themselves are not suited for direct application to the deflection coils of a cathode ray tube they must first be amplified through a power amplifier 13 in accordance with the invention which accepts input voltage waveforms and produces output current waveforms. In addition to amplifying the waves the amplifier 13 also accurately reproduces the input waveform and provides means centering the cathode ray beam. The output of the amplifier is applied to the vertical deflection coil 14 of the cathode ray tube 15 wherein the beam is centered and deflected from the center position in accordance with the applied deflection currents.

The power amplifier 13 as shown in schematic form in Fig. 2 is a three-stage D. C. coupled feedback amplifier. Two of the stages are series-connected amplifier tubes used to drive the grid of the third stage, the output stage, which comprises two electron discharge tubes connected in parallel. The sawtooth voltage from generator 12 is applied at terminal 37 to the grid of the first section of discharge device $V_1$, which comprises the first amplifier stage, through coupling capacitor 16 and resistor 17. The anode of the first section is connected to a source of positive potential at terminal 18 through resistor 19 and the cathode connected to ground potential. The anode of the first section is also direct current coupled to the grid of the second section of tube $V_1$ which comprises the second amplifying stage, through parallel connected resistor 20 and capacitor 21. The anode of the second section is connected to the terminal 18 through resistor 22 and the cathode is connected to ground potential. Bias voltage is provided to the grid of the second section through resistor 23 connected to a source of negative potential at terminal 24. A bypass capacitor 25 connects the grid of the second section to ground. The amplified signal at the anode of the second section of $V_1$ is direct current coupled to the output stage comprising the parallel connected electron discharge devices $V_2$ and $V_3$ through parallel connected resistor 26 and capacitor 27. The coupling resistor 26 is connected to the control grids of tubes $V_2$ and $V_3$ through resistor 28 and resistor 29 respectively, to terminal 24 through resistor 30 and to ground through bypass condenser 31. The screen grids of tubes $V_2$ and $V_3$ are connected directly to the terminal 18 and the cathodes of the tubes are connected to ground potential through resistor 32 and resistor 33, respectively. Current to the anodes of tubes $V_2$ and $V_3$ is applied through a parallel feed comprising in one arm a series connected resistor 34 and retard coil 35 connected to a second source of positive potential at terminal 36 and in the other arm a series connected deflection coil 14 and monitor resistor 38 connected to the positive terminal of source 18. Both positive potential sources have their negative terminals connected to ground. Resistor 39 is also connected in parallel with deflection coil 14 to damp any stray oscillations in the circuit and to limit the impedance of coil 14. Feedback is supplied in the amplifier from the junction of coil 14 and resistor 38 to the grid of the first section of $V_1$ through parallel connected resistor 40 and condenser 41. To provide a variable bias to the input of the amplifier a series connected resistor 42 and potentiometer 43 is connected between the grid of the first section and the terminal 24. This variable bias arrangement in conjunction with the direct-current coupling between stages, provides the means for varying the direct-current through the load. The center tap of potentiometer 43 is connected directly to terminal 24.

The mode of operation of the amplifier of Fig. 2 will now be considered in detail. In the tubes $V_2$ and $V_3$ the potentials of the sources connected to terminals 18 and 36 and the impedances 34, 35, 14 and 38 are chosen so that in the absence of an input signal, and with normal grid voltage, all of the direct current flow is through arm of the parallel feed including resistor 34 and coil 35 and none is through that arm including the deflector coil 14 and resistor 38. The plate potential for zero signal input is therefore substantially the value of source 18. With no current in the deflection coil there is no deflection field hence the cathode ray beam is automatically centered on the face of the tube. When a sawtooth voltage is applied to grid of the first section of tube $V_1$ the signal is amplified therein and applied through coupling resistor 20 to the second section where it is again amplified and applied through coupling resistor 26 to the grids of parallel connected tubes $V_2$ and $V_3$. Capacitors 21 and 27 are associated respectively with coupling resistors 20 and 26 to compensate for stray capacitance in the coupling circuits and thereby provide additional phase margin near gain crossover of the amplifier. The output stage uses two electron discharge tubes $V_2$ and $V_3$ connected in parallel to provide sufficient output current to drive the deflection coil for full vertical deflection. In the parallel feed circuit the impedance of resistor 34 and retard coil 35 is further chosen to be very high with respect to that of the deflection coil 14, resistor 39 and monitoring resistor 38 so that when the sawtooth signal is applied to the grids of $V_2$ and $V_3$ the change in plate current flow resulting therefrom is carried almost entirely through the deflection coil 14 and monitoring resistor 38. Hence, there is produced in the deflection coil a current waveform that is subtantially a replica of the applied sawtooth voltage waveform. With this feed arrangement, the impedance of the two arms in parallel appears to be purely resistive when viewed from the anodes of $V_2$ and $V_3$.

Any deviation from linear reproduction of the sawtooth waveform in the output of the amplifier is corrected by the feedback from the junction of the monitoring resistor and the deflection coil to the grid of the first section of tube $V_1$. In this manner the input voltage to the amplifier is made to be that of the applied sawtooth voltage and the difference between the applied sawtooth voltage and the voltage across the monitoring resistor due to the current in the deflection coil. To insure good linear reproduction the loop gain of the feedback amplifier is made to be high, preferably in the range of 50 decibels.

A manual control for additional cathode ray beam and the sweep trace centering is provided by biasing the grid of the first section of tube $V_1$ to the source of negative potential 24 through resistor 42 and potentiometer 43. By adjustment of the potentiometer there may be introduced into the amplifier input an additional constant potential component which will directly contribute to the amount and direction of current flow through the deflection coil 14. Due to the fact that the manual centering control is connected into the amplifier at one terminal of the feedback loop very sensitive and large corrections may be made in the vertical position of the cathode ray beam and sweep trace. It is clear, of course, that the described method for manual centering control is made possible only through the use of direct current coupling between the stages of the amplifier.

While there are a number of possible values suitable for use in the circuit elements, values used in an operable embodiment of a power amplifier of Fig. 2 and which are listed below merely by way of example are:

$V_1$—396A (Western Electric)
$V_2$—6AR6
$V_3$—6AR6
14—0.150 henry
16—1 microfarad
17—1 megohm
18—300 volts
19—20,000 ohms
20—75,000 ohms
21—10 micro-microfarads
22—20,000 ohms
23—0.15 megohm
24——300 volts
25—510 micro-microfarads
26—75,000 ohms
27—10 micro-microfarads
28—100 ohms
29—100 ohms
30—0.11 megohm
31—560 micro-microfarads
32—22 ohms
33—22 ohms
34—800 ohms
35—6.8 henries
36—450 volts
38—390 ohms
39—2000 ohms
40—2 megohms
41—10 micro-microfarads
42—1.8 megohms
43—0.5 megohm It is understood that the above-described arrangements are merely illustrative of the application of the principles of the invention. Numerous other arrangements might be devised by those skilled in the art without departing from the spirit or scope of the invention.

What is claimed is:

1. An amplifier including an input terminal, means for applying a varying signal to said input terminal, means including a multiple feed arrangement for providing current to said amplifier, said current means being selected so that in the absence of said signal substantially all of the current to said amplifier is carried in a first arm of said feed arrangement and in the presence of said signal the differential current resulting therefrom is carried in the second arm of said feed, said second arm comprising a plurality of impedances connected in series, feedback means connected between a junction of said impedances and said input terminal, and a bias means connected to said input terminal whereby an additional current may be caused to flow in said second arm.

2. An amplifier including an input signal terminal, means for applying a varying signal to said signal terminal, an input current terminal, means for applying current to said current terminal, said means including a first potential source, a first impedance arm, a second potential source and a second impedance arm, said sources and impedance arms being selected so that in the absence of a varying signal at said input signal terminal substantially all of the current applied is through said first impedance arm and in the presence of a varying signal the differential current flow resulting therefrom is applied through said second impedance arm, said second impedance arm including a plurality of series connected impedances, and feedback means connected between a junction of said impedances and said input signal terminal.

3. An amplifier according to claim 2 in further combination with bias means including a third potential source connected to said input terminal whereby an additional current is caused to flow in said second arm.

4. An amplifier according to claim 3 wherein said plurality of series connected impedances comprise an inductor and a resistor.

5. An amplifier comprising an input signal terminal, means for applying an input signal to said input signal terminal, an electron discharge device comprising an anode, a cathode, and a control grid, means for connecting said input terminal to said control grid, a first and a second source of constant potential each having a positive terminal and a negative terminal, means for connecting said cathode to said negative terminals, a first impedance means connecting said positive terminal of said first source to said anode, a second impedance means including a series connected inductor and monitoring resistor connecting said positive terminal of said second source to said anode, said sources and said impedance means being selected for providing in the absence of an input signal at said input signal terminal substantially all current to said anode through said first impedance means and in the presence of said signal the differential current flow to said anode resulting therefrom through said second impedance means, and feedback means including a load resistor connected between the junction of said inductor and resistor and said input terminal.

6. An amplifier according to claim 5 in further combination with bias means including a variable resistor and a third potential source connected to said input terminal whereby an additional current is caused to flow in said second impedance means.

7. An amplifier comprising a first and a second electron discharge device each including an anode, a cathode and a grid, means for applying an input signal to the grid of said first device, means including a first resistor for coupling the anode of said first device to the grid of said second device, a first, a second and a third source of constant potential each including a positive terminal and a negative terminal, means for connecting the cathodes of said devices to the negative terminals of said first and second sources and to the positive terminal of said third source, means for connecting the anode of said first device to the positive terminal of said first source, a first impedance means connecting the positive terminal of said first source to the anode of said second device, a second impedance means including a series connected inductor and a second resistor connecting the positive terminal of said second source to the anode of said second device, said impedance means and associated potential sources being selected for providing in the absence of an input signal at the grid of said first device substantially all of the current flow to said anode through said first impedance means and in the presence of said signal the differential current flow to said anode resulting therefrom through said second impedance means, feedback means including a third resistor connected between the junction of said inductor and said second resistor and the grid of said first device, and bias means including a variable resistor connected between the negative terminal of said third source and the grid of said first device whereby an additional current is caused to flow through said second impedance arm.

8. An amplifier including an input terminal, means for applying a varying signal to said input terminal, a first current means supplying current to said amplifier in the absence of said signal input, a second current feed means comprising a plurality of impedances connected in series supplying an additional current to said amplifier in the presence of said signal input, feedback means connected between a junction of said impedances and said input terminal, and a bias means connected to said input terminal.

References Cited in the file of this patent

UNITED STATES PATENTS

| | | |
|---|---|---|
| 2,204,571 | Byrne | June 18, 1940 |
| 2,513,354 | Parker | July 4, 1950 |

FOREIGN PATENTS

| | | |
|---|---|---|
| 567,021 | Great Britain | Jan. 24, 1945 |